United States Patent [19]

Nuckolls

[11] 4,274,033
[45] Jun. 16, 1981

[54] HIGH-FREQUENCY LAMP OPERATING CIRCUIT

[75] Inventor: Joe A. Nuckolls, Hendersonville, N.C.

[73] Assignee: General Electric Company, Schenectady, N.Y.

[21] Appl. No.: 49,193

[22] Filed: Jun. 18, 1979

Related U.S. Application Data

[63] Continuation-in-part of Ser. No. 350,520, Apr. 12, 1973, abandoned.

[51] Int. Cl.³ .................... H05B 37/02; H05B 39/04; H05B 41/36
[52] U.S. Cl. ..................... 315/209 R; 307/252 B; 307/252 T; 315/207; 315/240; 315/272; 315/243; 315/227 R
[58] Field of Search .............. 315/207, 208, 209, 227, 315/238, 240, 243, 246, 272, 276; 307/252 R, 252 A, 252 B, 252 T, 252 Q

[56] References Cited

U.S. PATENT DOCUMENTS

| | | | |
|---|---|---|---|
| 3,025,418 | 3/1962 | Brahm | 307/252 T |
| 3,310,687 | 3/1967 | Howell | 315/207 |
| 3,317,789 | 5/1967 | Nuckolls | 307/252 T |
| 3,344,310 | 9/1967 | Nuckolls | 307/252 B |
| 3,414,768 | 12/1968 | Peeks, Jr. | 307/252 B |
| 3,422,309 | 1/1969 | Spira et al. | 307/252 R |
| 3,621,295 | 11/1971 | Callan | 307/252 Q |
| 3,651,351 | 3/1972 | Quinn | 307/252 T |
| 3,657,598 | 4/1972 | Nomura et al. | 315/209 |
| 3,749,976 | 7/1973 | Colyn | 315/306 |
| 3,806,739 | 4/1974 | Irie et al. | 307/252 B |

Primary Examiner—Saxfield Chatmon, Jr.
Attorney, Agent, or Firm—Sidney Greenberg; Lawrence R. Kempton; Philip L. Schlamp

[57] ABSTRACT

High frequency circuit for operating gaseous discharge lamps includes oppositely poled controlled semiconductor switches connected to a resonant circuit comprising a capacitor and inductor connected to the lamp load and serving both as a high-frequency ballast for the lamp and to effect alternating turn-off of the semiconductor switches. Diodes are connected to the switches in a manner to provide energy pulses on the lamp load without return to the supply source. A control circuit is provided for alternately triggering the semiconductor switches into operation.

12 Claims, 5 Drawing Figures

HIGH-FREQUENCY LAMP OPERATING CIRCUIT

This application is a continuation-in-part of co-pending application Ser. No. 350,520 filed Apr. 12, 1973, now abandoned.

The present invention relates to high-frequency circuits for starting, operating and controlling loads such as gaseous discharge lamps.

It is an object of the invention to provide a high-frequency circuit which provides improved control of the operation of loads such as gaseous discharge lamps.

It is another object of the invention to provide a high-frequency load pulsing circuit of the above type which operates from an alternating or direct current supply source and produces a controlled energy flow to the load.

Still another object of the invention is to provide a circuit of the above type which efficiently uses inductive and capacitive ballast components for lamp ballasting, power-switch turn-off, high voltage generation for lamp ignition and re-ignition, and voltage transformation between the supply source and the load.

It is a further object of the invention to provide an efficient energy processing and handling circuit which extracts energy from a sinewave source, using minimum energy storage while processing high frequency alternating current energy pulses to the load without return to the source.

Another object of the invention is to provide a circuit of the above type having power switch control and feedback means to achieve the desired load wattage operating level and regulation compensating for source voltage and lamp load variations.

Still a further object of the invention is to provide a circuit arrangement of the above type which stores energy in the ballast means in such manner as to facilitate turn-off of the power switching devices, and to prevent low frequency load current runaway.

Other objects and advantages will become apparent from the following description and the appended claims.

With the above objects in view, the present invention in one of its aspects relates to a high-frequency starting, operating and control circuit comprising, in combination, a source of current, a load connected to said source of current, impedance means connected between said load and said source of current in series therewith, first controlled rectifier switching means connected between said source of current and said impedance means in series therewith, second controlled rectifier switching means connected in parallel with said series connected impedance means and said load, unidirectional current means in series with each of said switching means for directing energy pulses to said load and blocking normal source current flow, and control means including triggering means connected to said first and second controlled rectifier switching means for alternate actuation thereof, whereby the alternating energizing of said controlled rectifier switching means applies high frequency energy pulses to said load for starting and operating the same.

In a preferred embodiment of the invention, the impedance means comprises a capacitor and an inductor connected in series to form a series resonant circuit and provide ballast for the load, such as a gas discharge lamp, while serving as commutating means for turning off the respective controlled switching means.

The invention will be better understood from the following description taken in conjunction with the accompanying drawings, in which.

Figure 1:
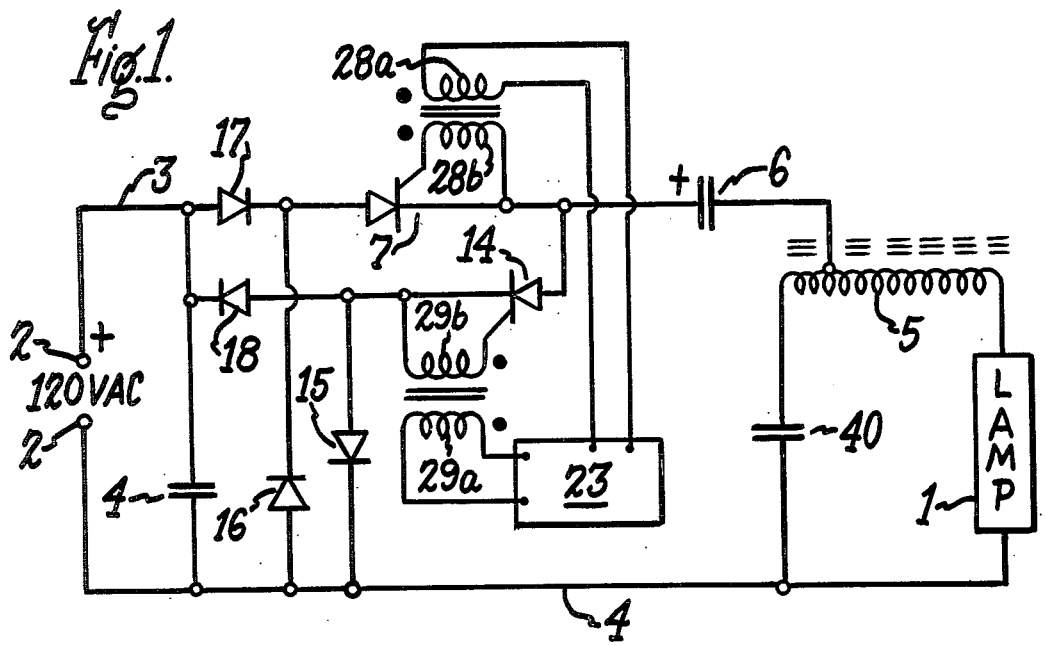
FIG. 1 is a circuit diagram of a high-frequency circuit embodying the present invention for operating a gaseous discharge lamp.

Referring now to the drawings, and particularly to FIG. 1, there is shown a circuit diagram illustrating an embodiment of the high-frequency circuit of the invention. As shown, the circuit comprises an arrangement for starting, operating and controlling gaseous discharge lamp 1, such as a mercury vapor or sodium vapor lamp, connected by supply conductors 3 and 4 to terminals 2 of a source of electrical current, which may be either an alternating current or a direct current source. Connected in series with lamp 1 and the electrical supply is an induction coil 5, such as a choke coil, and capacitor 6 in series therewith which serve as a ballasting means for lamp 1, as well as additional functions as described below. Connected across supply terminals 2 is storage capacitor 4 which serves as a stiff source of energy during the operation of the circuit. Arranged between the supply source and capacitor 6 in series therewith is a controlled switch such as silicon controlled rectifier (SCR) 7. The operation of SCR 7 is controlled by an actuating or triggering circuit 23, which may be constructed as shown in greater detail in FIG. 2, although other forms of control circuits in combination with desired feedback may be employed.

In the described circuit, capacitor 6 forms with inductor 5 a series-resonant circuit which upon firing of SCR 7 effects resonant charging of capacitor 6. To provide for resonant discharge of capacitor 6, SCR 14 is connected across series connected capacitor 6 and inductor 5 via diode 15 to supply conductor 4 to form a series discharge loop.

Actuating circuit 23 includes primary windings 28a and 29a of trigger pulse transformers (see FIG. 2), with the secondary windings 28b and 29b thereof respectively connected to the gate electrodes of SCR 7 and SCR 14 as shown for alternately triggering the latter switches at high frequencies as a result of the operation of control circuit 23. Trigger pulses are varies in pulse reoccurrence frequency to provide duty cycle or time ratio load wattage control.

Diodes 15, 16, 17 and 18 arranged as shown provide for the flow of energy to the load during operation of the circuit so as to largely prevent its return to the supply source, while preventing source shorting, thus contributing to high power factor and efficiency.

In the illustrated embodiment, capacitor 6 is connected to a tap on inductor 5 between primary and secondary windings of the latter coil, which in operation serves as an autotransformer for stepping up the initial voltage to be applied to lamp 1. Capacitor 40 connected at one side to the start of the primary winding and at the other side to supply line 4 forms with the primary winding a high-frequency resonant circuit which together with inductor 5 constitutes a high voltage pulse generator for ignition and reignition of lamp 1.

In the operation of the described circuit, when the supply source is positive as shown and an instantaneous driving voltage is available, SCR 7 is energized, forming a conducting loop through diode 17, SCR 7, capacitor 6, inductor 5 and capacitor 40 to the return side of the line. A high voltage, low energy pulse will appear initially across lamp 1 for ignition of the latter as the instantaneously available voltage appears across the primary turns of inductor 5 and is transformed to high voltage across the total winding of the inductor. Once the lamp is ionized, pulses are applied thereto as current is drawn from the source through SCR 7, capacitor 6 and inductor 5. During this period capacitor 6 and inductor 5 form a series resonant charging circuit. The characteristic impedance of this circuit is made low enough in magnitude relative to the effective lamp resistance or loading to effect an underdamped circuit operation forcing a high instantaneous reverse voltage to be generated across capacitor 6 which causes SCR 7 to turn off. After a controlled and variable time delay provided by the control circuit 23, SCR 14 is triggered, closing a discharge path for the voltage across capacitor 6 comprising SCR 14, diode 15, lamp 1 and inductor 5. SCR 14 is then commutated (i.e., turned off) by the resonant action as the voltage across capacitor 6 again reverses in the opposite direction. After a controlled and variable delay, SCR 7 is fired to repeat the cycle. As will be understood, when the supply source has the opposite polarity, the reverse procedure takes place, that is, capacitor 6 is charged through SCR 14 and diode 18 and is discharged through SCR 7 and diode 16.

The current pulse delivered to lamp 1 is a high-frequency fractional sinewave pulse, first going positive as SCR 7 is energized and later negative as SCR 14 is energized. The peak magnitude of the current is determined by the peak instantaneous input voltage and the characteristic impedance magnitude of the power loop plus the effective lamp impedance. The wattage level delivered to lamp 1 is controlled by the pulse reoccurrence frequency of these current pulses generated in any given period of time, e.g., one-half cycle of the 60 Hertz source. Lamp 1 is actually operated in a high frequency a-c mode under each half-cycle of the source sinewave. Under the alternate source polarities, the sequence of the switching SCR's reverses while they function in the same manner on each half cycle of the 60 cycle a-c input.

Figure 1A:
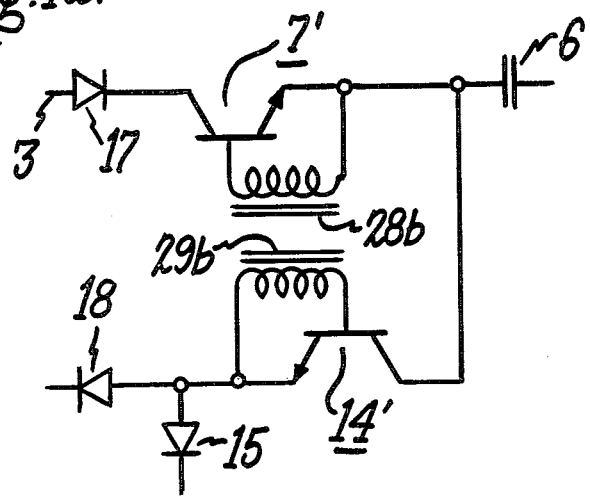
FIG. 1a shows a modification of the controlled switching means employed in the circuit shown in FIG. 1.

FIG. 1a shows a modification of the FIG. 1 circuit wherein transistors 7' and 14' are substituted respectively for SCR's 7 and 14. In this arrangement, transistor 7' has its collector connected to the supply source and its emitter connected to one side of capacitor 6, while the collector of transistor 14' is connected to the junction of the transistor 7' emitter and capacitor 6, and the emitter of transistor 14' is connected to the junction of diodes 15 and 18. Secondary windings 28b and 29b are connected between the base and the emitter of the respective transistors. As will be understood, voltage pulses are alternately supplied to the bases of the transistors from control circuit 23 for alternately switching the transistors on, which thereby operate substantially in the manner of the SCR's (which are semi-conductors also known as thyristors) as described in connection with the FIG. 1 circuit.

Figure 2:
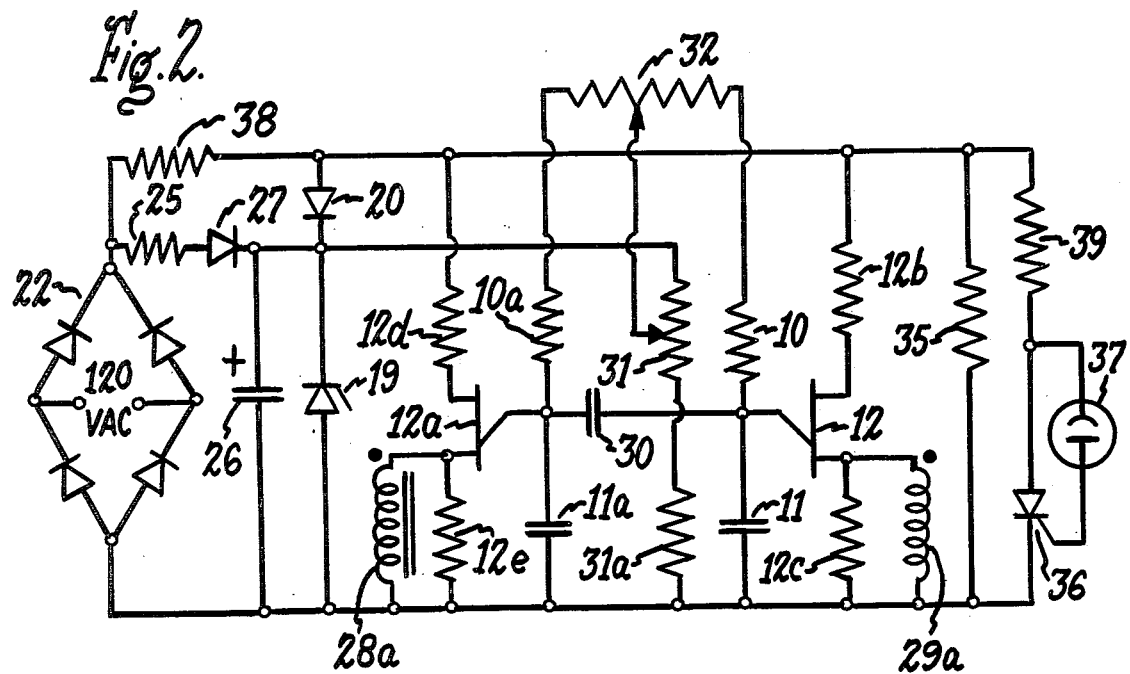
FIG. 2 is a circuit diagram of a control circuit which may be employed to control the operation of the FIG. 1 circuit in accordance with the invention.

FIG. 2 shows a control circuit which may be used for controlling the operation of the above-described circuits. In this circuit a variable pulse reoccurrence frequency oscillator is used as the triggering circuit for operating both SCR's 7 and 14. In this circuit two identical unijunction transistors (UJT) 12 and 12a are connected across a common power supply constituted by Zener diode 19 connected across full wave rectifier bridge 22 from an alternating current source, with a common capacitor 30 connecting the emitters of the two UJT's to provide for operation of only one UJT at a time.

Resistor 10 and capacitor 11 constitute an RC circuit for UJT 12, and resistor 10a and capacitor 11a constitute an RC circuit for the other UJT 12a, these RC circuits being connected by a resistor 32. The resistance of these charging circuits is made variable by adjusting the voltage applied to them, and for this purpose there is provided a potentiometer comprising resistor 31 connected in series with resistor 31a across the RC circuits as shown. When this potentiometer is adjusted, it changes the voltage applied to the charging circuits of the UJT's 12, 12a. The base-to-base voltage of the UJT's is held constant by the voltage clamping function of Zener diode 19, and consequently the timing provided by the RC circuits is changed as the driving voltage for the charging circuits is changed relative to the fixed base-to-base voltage. Potentiometer 32 connected between the RC timing circuits with voltage applied at the adjustable tap thereon provides for adjustment to correct for circuit dissymmetry and UJT variations which would result in unequal time intervals between the output pulses. This circuit also provides for a pulse delay time interval greater than the turn-off time of the SCR's 7 and 14 between pulses of two pulse sequences.

Capacitor 26 across bridge 22 serves as a stiff source of energy.

Resistor 25 and diode 27 connected in series between bridge 22 and resistor 31 serve to limit the current through Zener diode 19, limit charging current to capacitor 26, and allow capacitor 26 to remain charged when the line is near voltage zero.

Diode 20 in series with Zener diode 19 limits the base drive voltage to a value slightly above that of Zener diode 19 and prevents discharge of capacitor 26 during line voltage zero.

Resistors 10 and 10a also serve as minimum resistance means to provide for limiting the current when potentiometer 31 is set at a high level.

In the operation of the described pulse reoccurrence frequency PRF oscillator, the respective RC charging circuits are alternately charged and the operation of UJT's 12 and 12a is alternately effected. Capacitor 30 serves to interconnect the two charging circuits so as to provide for disabling one as the other is being actuated, and thereby synchronizing the operation of the UJT's. As the impedance of the emitter to ground reaches the low state, capacitor 30 pulls the emitter of the alternate UJT and its charging circuit toward ground, which disrupts its normal charging cycle. As the emitter regains its high impedance state after discharge of its charging capacitor, coupling capacitor 30 is allowed to raise its voltage, thereby effectively releasing the charging circuit which continues its normal charging cycle. This mechanism is repeated on the alternate UJT operation.

Resistor 38 and diode 20 comprise a 120 Hertz voltage supply network which falls to below the driving voltage required by the PRF oscillator circuit when the sinewave source voltage is near zero to prevent triggering of the SCR switch during that interval.

Near source sinewave zero, the oscillator is disabled as the base-to-base driving voltage is removed from both UJT's. Resistor 35 connected across the latter serves to ensure complete voltage collapse.

Control of the operation of the described circuit by photoelectric control action is provided by incorporating SCR 36 or other light controlled switch means across the circuit as shown, with photoconductor 37 such as a cadmium sulfide photocell connected to the gate of the SCR, such that when light strikes cell 37, its resistance is lowered thus turning on SCR 36 and thereby removing the UJT's base-to-base voltage and stopping their oscillation.

Resistor 38 serves to limit current through the branch including diode 20 and Zener diode 19. Resistor 39 serves to provide a minimum resistance in series with SCR 36 to ensure a minimum current below holding current levels to aid in turning off SCR36.

Figure 3:
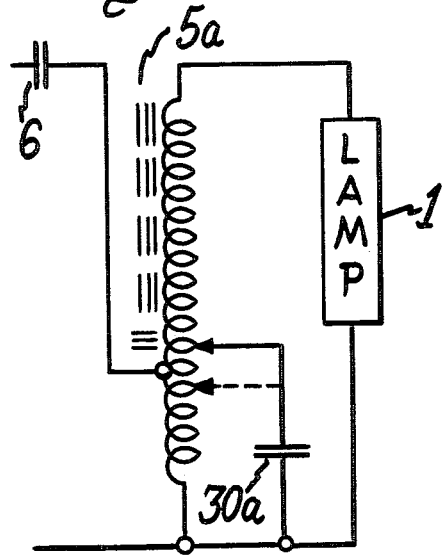
FIG. 3 shows a modification of the FIG. 1 circuit including a high-frequency lag ballast autotransformer.

FIG. 3 shows a modification of the FIG. 1 circuit in which a high frequency lag ballast in the form of high frequency autotransformer 5a is substituted for the choke coil 5 of FIG. 1, with high frequency producing capacitor 30a connected across the primary winding. The alternate tap connections of capacitor 30a on the autotransformer as shown provide for the high frequency, high voltage pulse polarity to be selected to produce pulses in the same or opposite direction as the power pulse in order to obtain optimum performance. Such a lag ballast provides for voltage transformation, i.e., impedance matching, such that a lamp of any voltage may be operated from any common line voltage.

Figure 4:
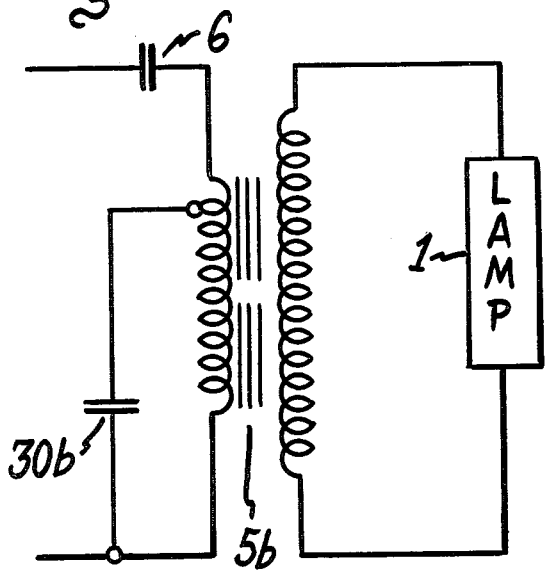
FIG. 4 shows another modification of the FIG. 1 circuit including a leakage reactance isolation transformer.

FIG. 4 shows another modification of the FIG. 1 circuit embodying a high leakage reactance isolation transformer 5b with capacitor 30b connected across the primary winding. This form of ballast provides for electrical isolation of the lamp circuit from the power source, in addition to the above mentioned voltage and impedance transformation.

While the present invention has been described with reference to particular embodiments thereof, it will be understood that numerous modifications, such as the use of modern integrated circuits and digital processes and controls, may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A high frequency starting, operating and automatic control circuit comprising, in combination, a source of current, a load connected to said source of current, impedance means connected between said load and said source of current in series therewith, first controlled semiconductor switching means connected between said source of current and said impedance means in series therewith, second controlled semiconductor switching means connected in parallel with said series-connected impedance means and said load, unidirectional current means in series with each of said controlled semiconductor switching means for directing energy pulses to said load and blocking normal source current flow, and control means including triggering means connected to said first and second controlled semiconductor switching means for alternate actuation thereof, whereby the alternate energizing of said first and second controlled semiconductor switching means applies high frequency energy pulses to said load for starting, operating and controlling the same.

2. A circuit as defined in claim 1, said impedance means comprising a capacitor and an inductor connected in series and forming a series resonant circuit.

3. A circuit as defined in claim 2, and high voltage generating means connected to said inductor across said load for providing a high ignition voltage on said load.

4. A circuit as defined in claim 3, said inductor comprising primary and secondary windings, said high voltage generating means comprising a second capacitor connected to said primary winding.

5. A circuit as defined in claim 2, said inductor comprising a high leakage reactance autotransformer.

6. A circuit as defined in claim 2, said inductor comprising a high leakage reactance isolation transformer.

7. A circuit as defined in claim 2, said first and second controlled semiconductor switching means comprising silicon controlled rectifiers.

8. A circuit as defined in claim 2, said first and second controlled semiconductor switching means comprising transistors.

9. A circuit as defined in claim 5, and high voltage generating means comprising a second capacitor connected to a tap on said autotransformer for providing a high ignition voltage on said load.

10. A circuit as defined in claim 6, and high voltage generating means comprising a second capacitor connected to a tap on said transformer for providing a high ignition voltage on said load.

11. A high frequency starting, operating and automatic control circuit comprising, in combination, a source of current, a load connected to said source of current, impedance means connected between said load and said source of current in series therewith, first controlled semiconductor switching means connected between said source of current and said impedance means in series therewith, second controlled semiconductor switching means connected in parallel with said series-connected impedance means and said load, unidirectional current means in series with each of said controlled semiconductor switching means for directing energy pulses to said load and blocking normal source current flow, and control means including triggering means connected to said first and second controlled semiconductor switching means for alternate actuation thereof, whereby the alternate energizing of said first and second controlled semiconductor switching means applies high frequency energy pulses to said load for starting, operating and controlling the same, said source of current providing alternating current, said unidirectional current means comprising a first diode in series with said first semiconductor switching means, a second diode connected to the junction of said first diode and said first semiconductor switching means in parallel with said source of current, a third diode in series with said second semiconductor switching means and a fourth diode connected to the junction of said third diode and said second semiconductor switching means in parallel with said source of current.

12. A high frequency starting, operating and automatic control circuit comprising, in combination, a source of current, a load connected to said source of current, impedance means connected between said load and said source of current in series therewith, first controlled semiconductor switching means connected between said source of current and said impedance means in series therewith, second controlled semiconductor switching means connected in parallel with said series-connected impedance means and said load, unidirectional current means in series with each of said controlled semiconductor switching means for directing energy pulses to said load and blocking normal source current flow, and control means including triggering means connected to said first and second controlled semiconductor switching means for alternate actuation thereof, whereby the alternate energizing of said first and second controlled semiconductor switching means applies high frequency energy pulses to said load for starting, operating and controlling the same, said unidirectional current means comprising a first diode in series with said first semiconductor switching means, a second diode connected to the junction of said first diode and said first semiconductor switching means in parallel with said source of current, a third diode in series with said second semiconductor switching means and a fourth diode connected to the junction of said third diode and said second semiconductor switching means in parallel with said source of current.

* * * * *